(12) United States Patent
Decrossas et al.

(10) Patent No.: US 9,478,842 B1
(45) Date of Patent: Oct. 25, 2016

(54) INTERCONNECT BETWEEN A WAVEGUIDE AND A DIELECTRIC WAVEGUIDE COMPRISING AN IMPEDANCE MATCHED DIELECTRIC LENS

(71) Applicant: The United States of America as Represented by the Administrator of NASA, Washington, DC (US)

(72) Inventors: Emmanuel Decrossas, Pasadena, CA (US); Goutam Chattopadhyay, Pasadena, CA (US); Nacer Chahat, Pasadena, CA (US); Adrian J. Tang, Pasadena, CA (US)

(73) Assignee: The United States of America as Represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 14/658,411

(22) Filed: Mar. 16, 2015

(51) Int. Cl.
*H01P 5/08* (2006.01)

(52) U.S. Cl.
CPC ..................................... *H01P 5/087* (2013.01)

(58) Field of Classification Search
CPC ............ H01P 5/087; H01P 5/08; H01P 3/20; H01P 3/16; H01P 1/02; H01P 1/022; H01P 1/04; H01P 1/042
USPC .......................................... 333/21 R, 248, 34
See application file for complete search history.

(56) References Cited

U.S. PATENT DOCUMENTS

| | | | | |
|---|---|---|---|---|
| 3,866,143 A | * | 2/1975 | Jacobs et al. | H01P 1/185 331/107 G |
| 4,742,571 A | * | 5/1988 | Letron | H01P 5/08 333/247 |
| 4,825,221 A | * | 4/1989 | Suzuki et al. | H01P 3/16 333/239 |
| 4,875,026 A | * | 10/1989 | Walter et al. | H01P 3/16 333/239 |
| 5,859,615 A | | 1/1999 | Toland et al. | |
| 6,614,960 B2 | | 9/2003 | Berini | |
| 6,741,782 B2 | | 5/2004 | Berini | |
| 6,801,691 B2 | | 10/2004 | Berini | |
| 8,346,039 B2 | | 1/2013 | Lu et al. | |
| 8,476,681 B2 | | 7/2013 | Haddad et al. | |
| 8,761,561 B2 | | 6/2014 | Temelkuran et al. | |
| 8,903,205 B2 | | 12/2014 | Koss et al. | |
| 2002/0131667 A1 | | 9/2002 | Berini | |
| 2003/0059147 A1 | | 3/2003 | Berini | |
| 2004/0008943 A1 | | 1/2004 | Berini | |
| 2010/0111475 A1 | | 5/2010 | Lu et al. | |
| 2011/0220971 A1 | | 9/2011 | Haddad et al. | |
| 2011/0280515 A1 | | 11/2011 | Black et al. | |

(Continued)

OTHER PUBLICATIONS

Banik et al, "Catadioptric Microlenses for Submillimeter and Terahertz Applications" published at 17th International Symposium on Space Terahertz Technology May 10-12, 2006.

(Continued)

*Primary Examiner* — Benny Lee
(74) *Attorney, Agent, or Firm* — Mack Homer

(57) ABSTRACT

A lens for interconnecting a metallic waveguide with a dielectric waveguide is provided. The lens may be coupled a metallic waveguide and a dielectric waveguide, and minimize a signal loss between the metallic waveguide and the dielectric waveguide.

13 Claims, 8 Drawing Sheets

(56) References Cited

U.S. PATENT DOCUMENTS

| | | |
|---|---|---|
| 2012/0068891 A1 | 3/2012 | Haroun et al. |
| 2012/0318983 A1 | 12/2012 | Ouchi |
| 2013/0128330 A1 | 5/2013 | Frankel et al. |
| 2013/0221550 A1 | 8/2013 | Koos et al. |
| 2013/0223788 A1 | 8/2013 | Koos et al. |
| 2013/0237976 A1 | 9/2013 | Temelkuran et al. |
| 2014/0005646 A1 | 1/2014 | Temelkuran et al. |
| 2014/0091884 A1* | 4/2014 | Flatters .................. H01P 3/121 333/21 R |
| 2014/0099054 A1 | 4/2014 | Black et al. |
| 2014/0184351 A1 | 7/2014 | Bae et al. |
| 2014/0197509 A1 | 7/2014 | Haddad et al. |
| 2014/0285281 A1 | 9/2014 | Herbsommer et al. |
| 2014/0285294 A1 | 9/2014 | Haroun et al. |
| 2014/0368301 A1 | 12/2014 | Herbsommer et al. |

OTHER PUBLICATIONS

Jun Cao et al., "High-Efficiency Waveguide Couplers via Impedance-Tunable Transformation Optics" published at Cornell University Library on Aug. 1, 2014.

Sophocles J. Orfanidis, "Electromagnetic Waves and Antennas" Chapter 9, Waveguides, published by Rutgers University initially posted online in Nov. 2002, and revised on Jul. 2, 2014.

* cited by examiner

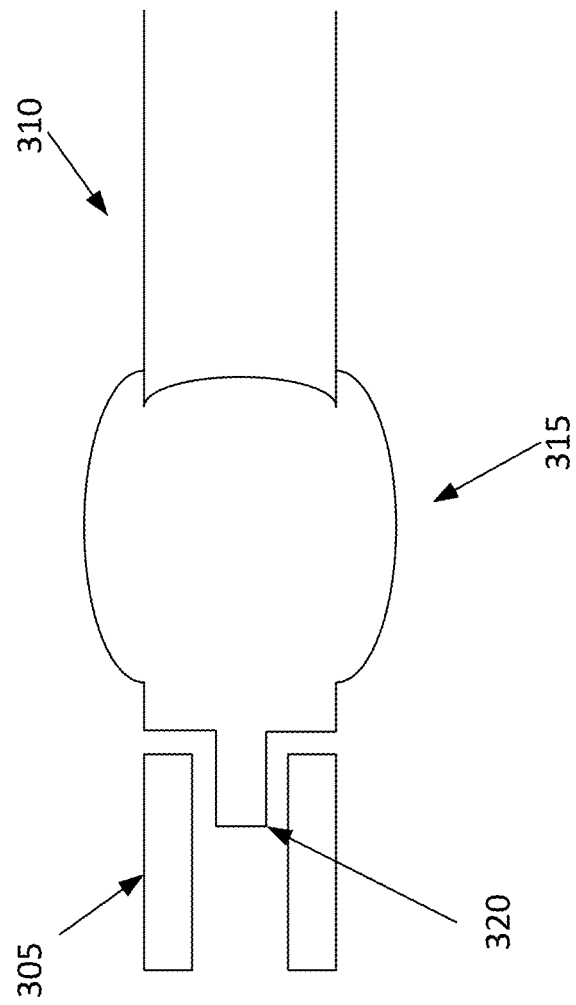

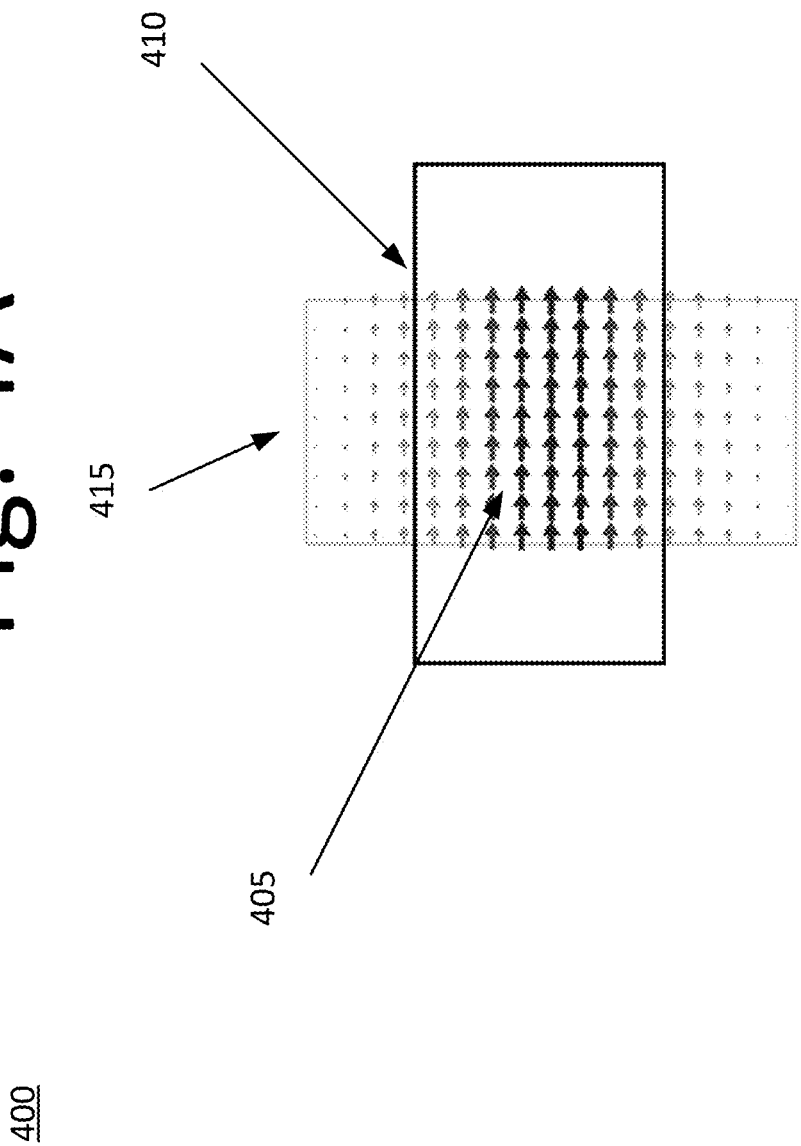

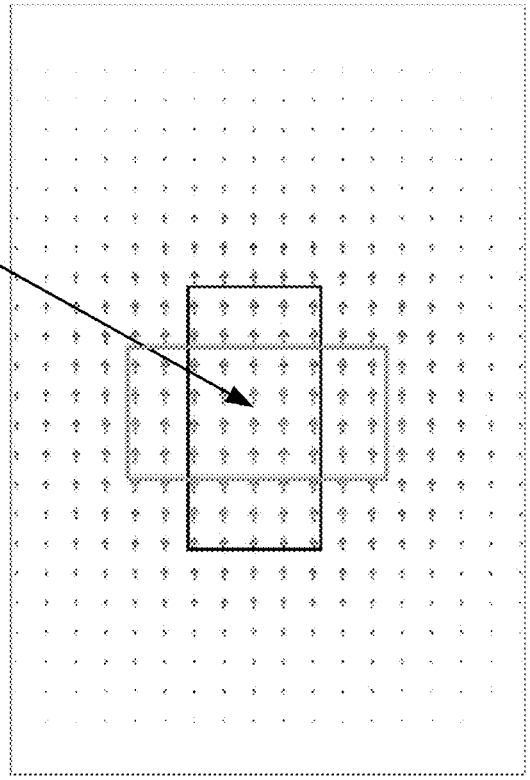

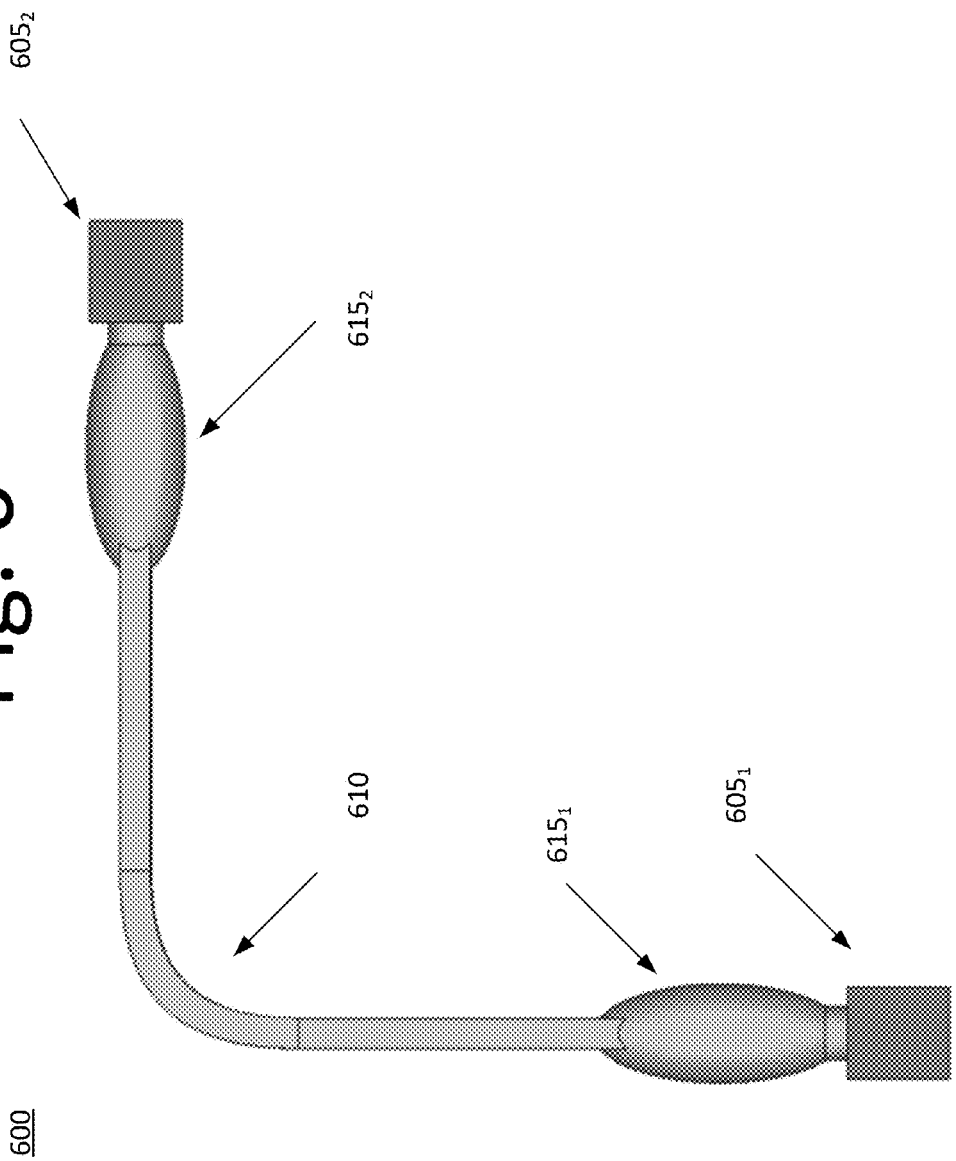

INTERCONNECT BETWEEN A WAVEGUIDE AND A DIELECTRIC WAVEGUIDE COMPRISING AN IMPEDANCE MATCHED DIELECTRIC LENS

ORIGIN OF THE INVENTION

Embodiments of the present invention described herein were made in the performance of work under NASA contract NNN12AA01C and are subject to the provisions of Public Law #96-517 (35 U.S.C. §202) in which the Contractor has elected not to retain title.

FIELD

The present invention generally pertains to interconnects for a dielectric waveguide, and more particularly, to a lens for interconnecting a conventional metallic waveguide to a dielectric waveguide.

BACKGROUND

A metallic waveguide may be connected to a dielectric waveguide by inserting the dielectric waveguide into a hole in the metallic waveguide. As shown in FIG. 1, a dielectric waveguide 110 includes a tapered portion 115 that is inserted within a hole (not shown) of a metallic waveguide 105. However, in this approach, less than one percent of the signal flows from metallic waveguide 105 to dielectric waveguide 115. Thus, a large amount of radiation is lost.

The most common type of interconnect used to connect a metallic waveguide to a dielectric waveguide is a corrugated horn. As shown in FIG. 2, a corrugated horn 215 connects a metallic waveguide 205 with a dielectric waveguide 210. However, this approach creates a bulky and expensive interconnect.

Thus, an alternative interconnect that is more cost effective and loses less radiation may be beneficial.

SUMMARY OF THE INVENTION

Certain embodiments of the present invention may be implemented and provide solutions to the problems and needs in the art that are outside the capabilities of conventional waveguide interconnects. For instance, some embodiments pertain to a lens that can connect one type of waveguide to another type of waveguide while reducing radiation leakage or signal loss at the interface of the waveguides.

In one embodiment, an apparatus includes a lens configured to connect a metallic waveguide to a dielectric waveguide. The lens may have a curvature configured to capture radiation leakage and return the radiation leakage to the dielectric waveguide.

In another embodiment, an apparatus includes an interconnect. The interconnect may be located between a first waveguide and a second waveguide, and may be configured to maximize power issued from the first waveguide to the second waveguide while minimizing power loss.

In yet another embodiment, an apparatus includes a first interconnect and a second interconnect. The first interconnect includes a curved lens configured to transfer power from a first waveguide to a second waveguide, while minimizing a loss of the power transferred from the first waveguide to the second waveguide. The second interconnect includes a curved lens configured to transfer power from the second waveguide to a third waveguide, while minimizing a loss of the power transferred from the second waveguide to the third waveguide.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 3A and 3B illustrate interconnect system using a lens, according to an embodiment of the present invention.

FIG. 4A illustrates a propagation mode in a rectangular waveguide, according to an embodiment of the present invention.

FIG. 4B illustrates a propagation of a hybrid mode in a dielectric waveguide, according to an embodiment of the present invention.

FIG. 6 illustrates an interconnect system for connecting a flexible dielectric waveguide to metallic waveguides, according to an embodiment of the present invention.

DETAILED DESCRIPTION OF THE EMBODIMENTS

Some embodiments of the present invention pertain to a lens interconnecting a conventional waveguide, such as a metallic waveguide, to a dielectric waveguide. The dielectric waveguide may be made of any suitable type of material. For example, the dielectric waveguide may be made of a conventional substrate, polymer, fabric, dielectric foam, or any type of material that would be appreciated by a person of ordinary skill in the art. In certain embodiments, the dielectric waveguide may be flexible or solid. Similarly, the lens may also be flexible or solid.

Figure 1:
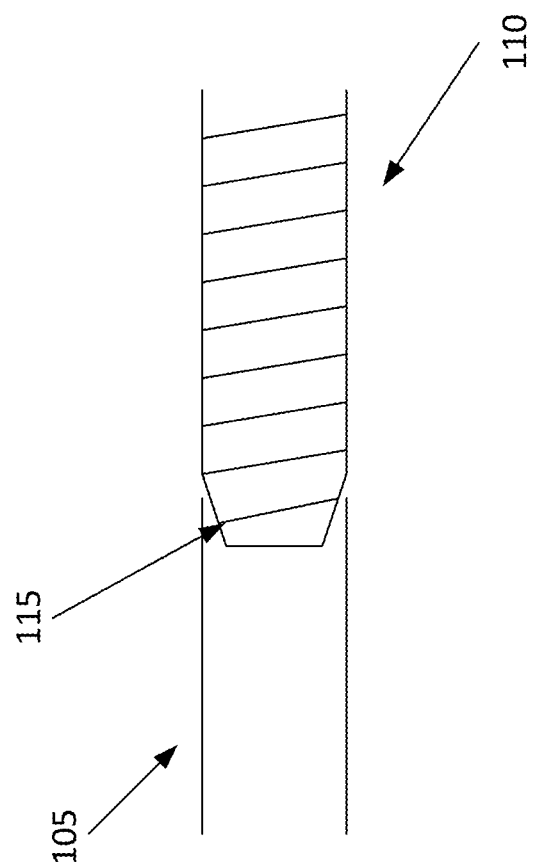
FIG. 1 illustrates a related art technique to connect a metallic waveguide to a dielectric waveguide.
Figure 2:
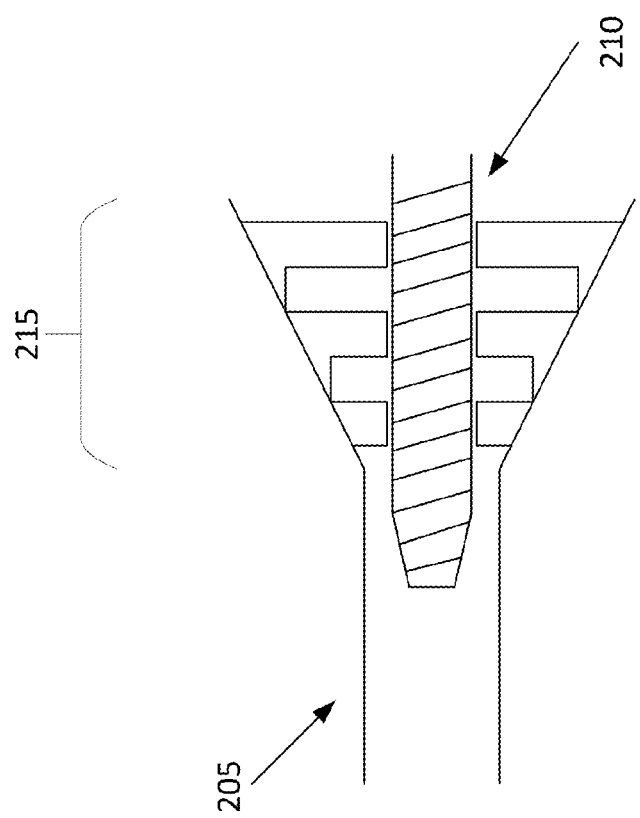
FIG. 2 illustrates a related art corrugated horn interconnect system.
Figure 3B:
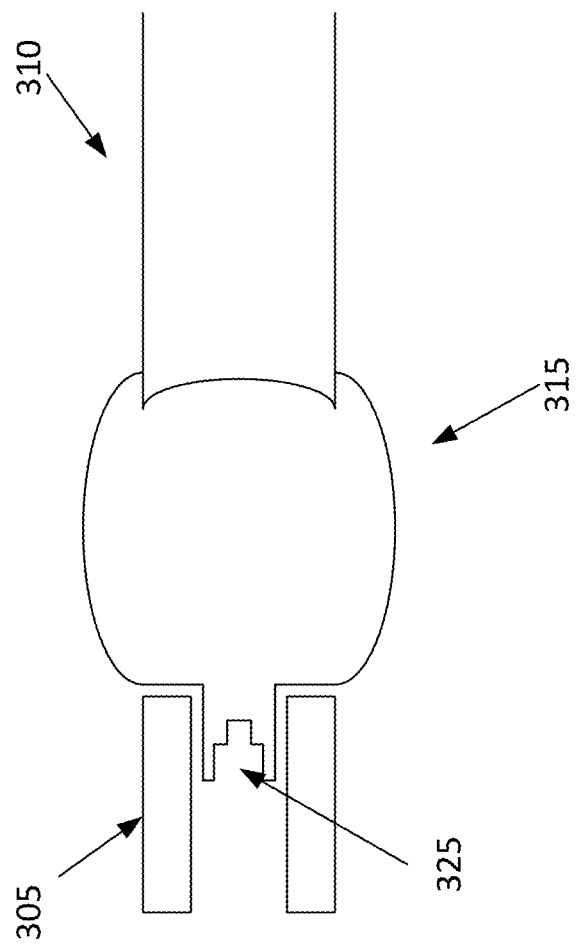

FIGS. 3A and 3B illustrate an interconnect system 300 using a lens 315, according to an embodiment of the present invention. In this embodiment, a lens 315 may connect metallic waveguide 305 with dielectric waveguide 310. In some embodiments, lens 305 may be fabricated from the same material as dielectric waveguide 310. The length and width of lens 315 may depend on the characteristics of dielectric waveguide 310.

It should be appreciated that the material of lens 315 may include a dielectric constant or relative real part of permittivity that is at least two times larger than the relative permittivity of the surrounding medium. For instance, if lens 315 is surrounded by air (relative permittivity=1), lens 315 may have a relative permittivity of more than 2. Cost effective material, such as Teflon™ or polyethylene, works in air and is easy to manufacture. The optimum dimensions of lens 315 depend on the material that is chosen and the working frequency. The same principle may apply to dielectric material 310.

In a further embodiment, lens 315 may be incorporated with dielectric waveguide 310 such that lens 315 and dielectric waveguide 310 are the same piece (not depicted). In other embodiments, lens 315 may be separate from dielectric waveguide 310, and may connect with dielectric waveguide 310 (as shown in FIGS. 3A and 3B). For example, in embodiments where lens 315 is separate from dielectric waveguide 310, lens 315 may connect with dielectric waveguide 310 by inserting dielectric waveguide 310 into lens 315 or vice versa.

As mentioned above, lens 315 may connect metallic waveguide 305 to dielectric waveguide 310, thus acting as an interconnect. In one embodiment, lens 315 may include input 320 or input 325. Input 320 (FIG. 3A) or input 325 (FIG. 3B) may be directly inserted, or plugged into, metallic waveguide 310. Input 320 or input 325, also known as the impedance matching section, may be stepped or tapered to reduce the amount of signal loss between metallic waveguide 305 and dielectric waveguide 310.

Input 320 in FIG. 3A, for example, shows a one-step transition into a hole of metallic waveguide 305. Input 325 in FIG. 3B, for example, shows a two-step transition. It should be appreciated that the embodiments described herein are not limited to the number of stepped transitions. Rather, additional steps at input 320 or input 325 of lens 315 may be used to facilitate an increase in impedance matching. This can be achieved so long as the length of metallic waveguide 305 is long enough to host the impedance matching section of lens 315. Also, the number of steps may depend on the length of lens 315. Furthermore, the geometry (positioning and size) of the steps will depend upon the working frequency of lens 315, metallic waveguide 305, dielectric waveguide 310, etc.

It should also be appreciated that the impedance matching section of lens 315 may prevent power from being reflected back into metallic waveguide 305 since power reflection can generally occur at input 320 or input 325 of lens 315. This impedance matching section provides a smooth transition from metallic waveguide 305 and ensures that maximum power is coupled to dielectric waveguide 310. Furthermore, the dimensions of lens 315, and possibly dielectric waveguide 310, may be designed to match the dimensions of metallic waveguide 305. This way, input 320 or input 325 of lens 310 may match the wave impedance from metallic waveguide 305 to dielectric waveguide 310. This also reduces the amount of power reflected back into metallic waveguide 305.

Generally, coupling energy from a metallic waveguide to a dielectric waveguide is less efficient. The incorporation of lens 315 may increase the energy transmission efficiency. For example, the curvature, positioning, and diameters of lens 315 may contribute to increasing the energy transmission efficiency. For example, the curvature of lens 315 may minimize the amount of radiation leakage (or signal loss) at the transition point between metallic waveguide 305 and lens 315. In other words, lens 315 may capture leaking radiation, and confine the radiation to dielectric waveguide 310. It should be appreciated that in other embodiments, lens 315 may include a series of steps instead of a curvature and achieve a similar result.

The curvature of lens 315 may be determined in some embodiments using the following equation.

$$x(t) = x0 + 1.2\lambda^* \cos(t) \quad \text{Equation (1)}$$

$$y(t) = y0 + 3\lambda^* \cos(t) \quad \text{Equation (2)}$$

Where x(t) and y(t) represent parametric equations of a parabola based on wavelength, t relates to the position of the curve in a three dimensional plot and x0 and y0 relate to the translation of the curve along their respective axes. In one embodiment, the positioning of the lens may be defined as t [−pi/2:pi/2], x0 is equal to 0, y0 is equal to −0.015 mm, and λ is the wavelength of the electromagnetic wave propagating in the medium. See, for example, X-Y-Z axis shown in FIG. 5.

The curvature of lens 315 may depend on the frequency of lens 315.

The position and diameter of lens 315 may be frequency dependent in some embodiments. For example, based on the working wavelength (the wavelength is inversely proportional to the working frequency), this may cause the dimensions of lens 315 to be reduced accordingly. Also, when the dimensions are too small, it may be difficult to manufacture matching section 320 or 325 and lens 315 cost effectively. To overcome this difficulty, lens 315 may be moved along the y axis. However, it should be appreciated that lens 315 may be centered for symmetry reason in some embodiments, so x0 is always equal to 0. Similarly, the diameter of lens 315 may be optimized for each working frequency, and may be restrained to a smaller diameter due the packaging consideration or fabrication issue. This is a trade-off between the length of lens 315, and the diameter and the matching section 320 or 325 of lens 315.

While FIGS. 3A and 3B show lens 315 connecting dielectric waveguide 310 with metallic waveguide 305, lens 315 may allow in other embodiments dielectric waveguide 310 to connect to any type of connector such as a solid waveguide, a plastic waveguide, a transmission line, etc. Waveguide 310 may be any shape, e.g., rectangular, circular, elliptical, etc. For each type of waveguide, the impedance matching section of lens 315 may be adjusted or optimized. In addition, dielectric waveguide 310 may include any shape, e.g., circular, rectangular, square, elliptical, hollow, etc.

Simply stated, lens 315 may be applied to any geometry of metallic waveguide 305 and/or dielectric waveguide 310. See, for example, FIGS. 4A and 4B. FIG. 4A illustrates a propagation mode 400 of one embodiment of the invention. This embodiment shows a propagation mode in a rectangular waveguide 405. In this embodiment, the propagation mode in the rectangular waveguide 405 is transverse electric 10 ($TE_{10}$) as shown in FIG. 4A. Also, in this embodiment, dielectric waveguide 410 may be orthogonal to the metallic transition 415. FIG. 4B illustrates a propagation mode 400 in a dielectric waveguide. This reflects an excited hybrid mode ($HE_{11}$) 420, as shown in FIG. 4B.

Figure 5:
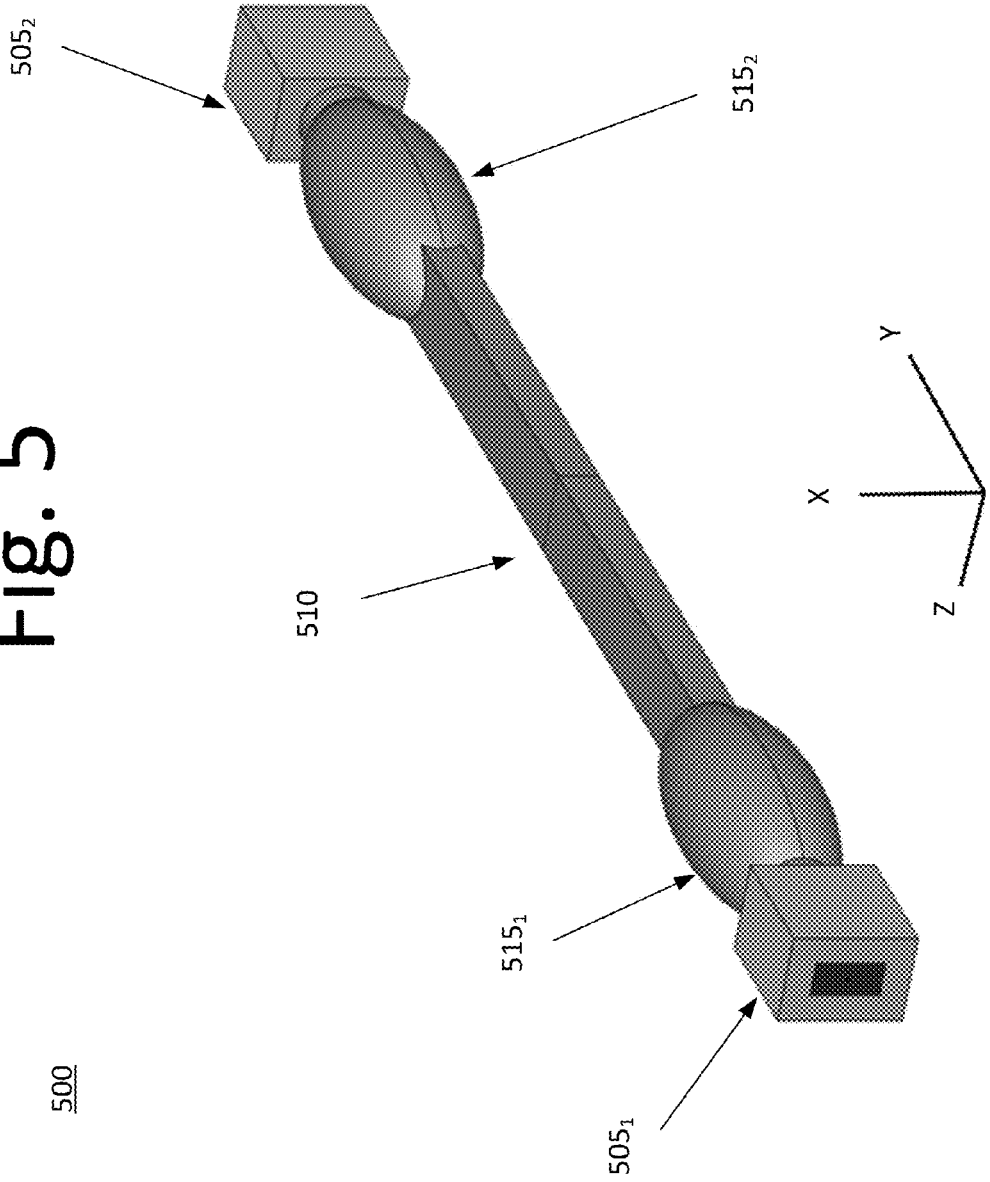
FIG. 5 illustrates an interconnect system using two lenses, according to an embodiment of the present invention.

FIG. 5 illustrates an interconnect system 500 using two lenses $515_1$, $515_2$, according to an embodiment of the present invention. In this embodiment, metallic waveguides $505_1$, $505_2$ are coupled to the ends of dielectric waveguide 510 using lenses $515_1$, $515_2$. Lenses $515_1$, $515_2$ may confine the energy radiating from waveguide $505_1$, for example, to dielectric waveguide 510 such that the loss associated with the radiated energy at the interface between waveguides $505_1$ and $515_1$ is at a minimum. A similar principle applies between dielectric waveguide 510 and waveguide $505_2$ with respect to lens $515_2$. It should be appreciated that dielectric waveguide 510 and lens $515_1$, $515_2$ may be a singular piece in certain embodiments. See, for example, FIG. 6.

FIG. 6 illustrates an interconnect system 600 for connecting a flexible dielectric waveguide 610 to metallic waveguides $605_1$, $605_2$, according to an embodiment of the present invention. In this embodiment, dielectric waveguide

610, including lens 615₁, 615₂ and may be made of the same flexible material as a singular piece. The flexible material allows dielectric waveguide 610 to bend without reducing the performance of the transmission (no power loss). While FIG. 6 shows dielectric waveguide 610 having a 90 degree bend, the flexibility is not limited to 90 degrees. It should also be appreciated that dielectric waveguide 610 may be connected to any connector and not just a metallic waveguide 605₁, 605₂. In other words, the flexibility of dielectric waveguide 610 allows dielectric waveguide 610, including lens 615₁, 615₂, to be used in any environment that would be appreciated by one of ordinary skill in the art.

Returning to FIG. 5, in other embodiments, dielectric waveguide 510 may be separate from lens 515₁ and lens 515₂, and in further embodiments, may be two separate pieces that connect to each other.

One or more embodiments of the present invention pertain to a lens configured to act as interconnect between one waveguide and another waveguide. The lens may include an impedance matching section to provide an improved matching impedance network at the discontinuity of the waveguides. In some embodiments, the lens may be designed as an ellipsoid to maximize power issued from one waveguide to the other waveguide.

The lens may be created using three-dimensional printing technology in some embodiments, and may be used in the telecom industry, in a server backplane, in cloud computing, memory interfaces, etc. The lens may be used in applications where low transmission/coupling losses are critical.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a lens, comprising an impedance matching section, configured to couple a metallic waveguide and a dielectric waveguide, and minimize signal loss between the metallic waveguide and the dielectric waveguide, wherein the lens is configured to minimize an amount of radiation leakage by redirecting radiation from the metallic waveguide to the dielectric waveguide, and wherein the impedance matching section comprises one of either a single step or multi-step transition at an insertion point between the metallic waveguide and the lens.

2. The apparatus of claim 1, wherein the lens further comprises flexible material.

3. The apparatus of claim 1, wherein the impedance matching section comprises a single step transition at the insertion point between the metallic waveguide and the lens.

4. The apparatus of claim 1, wherein the impedance matching section comprises a multi-step transition at the insertion point between the metallic waveguide and the lens.

5. The apparatus of claim 1, wherein the lens and the dielectric waveguide are made from a same material.

6. The apparatus of claim 1, wherein the lens further comprises material having a dielectric constant that is at least two times larger than a relative permittivity of a medium surrounding the lens.

7. An apparatus, comprising:
an interconnect, comprising an impedance matching section, between a first waveguide and a second waveguide, wherein the interconnect is configured to maximize power issued from the first waveguide to the second waveguide while minimizing power loss, wherein the interconnect comprises a curved lens to minimize an amount of radiation leakage at an insertion point between the first waveguide and the second waveguide and wherein the impedance matching section comprises one of either a single step or multi-step transition at an insertion point between the first waveguide and the lens.

8. The apparatus of claim 7, wherein first waveguide comprises a metallic waveguide.

9. The apparatus of claim 7, wherein second waveguide comprises a dielectric waveguide.

10. The apparatus of claim 7, wherein the interconnect comprises flexible material.

11. The apparatus of claim 7, wherein the interconnect further comprises material having a dielectric constant that is at least two times larger than a relative permittivity of a medium surrounding the lens.

12. The apparatus of claim 7, wherein the impedance matching section comprises a multi-step transition inserted within a hole of the first waveguide.

13. The apparatus of claim 7, wherein the impedance matching section comprises a single step transition inserted within a hole of the first waveguide.

* * * * *